US008347409B2

(12) United States Patent
Burns et al.

(10) Patent No.: US 8,347,409 B2
(45) Date of Patent: Jan. 1, 2013

(54) RESONANCE COMPENSATION IN SCANNING PROBE MICROSCOPY

(75) Inventors: Daniel James Burns, Cambridge, MA (US); Georg Ernest Fantner, Chavannes-près-Renens (CH); Kamal Youcef-Toumi, Cambridge, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 195 days.

(21) Appl. No.: 12/785,840

(22) Filed: May 24, 2010

(65) Prior Publication Data

US 2011/0289635 A1    Nov. 24, 2011

(51) Int. Cl.
G01Q 30/06 (2010.01)
G01Q 10/06 (2010.01)
G01Q 10/04 (2010.01)

(52) U.S. Cl. .......... 850/11; 850/3; 850/4; 977/850; 977/851; 977/872

(58) Field of Classification Search .......... 850/3, 4, 850/11; 977/850, 851, 872
See application file for complete search history.

(56) References Cited

U.S. PATENT DOCUMENTS

| 5,196,713 | A | * | 3/1993 | Marshall | ............. | 850/52 |
|---|---|---|---|---|---|---|
| 5,729,015 | A | | 3/1998 | Tong | | |
| 5,939,715 | A | | 8/1999 | Kitamura et al. | | |
| 7,111,504 | B2 | | 9/2006 | Blumberg et al. | | |
| 7,658,097 | B2 | | 2/2010 | Su et al. | | |
| 8,082,593 | B2 | * | 12/2011 | Sarioglu et al. | ............. | 850/6 |
| 2005/0109925 | A1 | | 5/2005 | Rifai et al. | | |
| 2008/0277582 | A1 | * | 11/2008 | Shi et al. | ............. | 73/105 |

OTHER PUBLICATIONS

Tien et al., "Iterative Control of Dynamics-Coupling-Caused Errors in Piezoscanners During High-Speed AFM Operation", IEEE Transactions on Control Systems Technology, vol. 13, No. 6, Nov. 2005, pp. 921-931.*

* cited by examiner

*Primary Examiner* — Jack Berman
(74) *Attorney, Agent, or Firm* — Occhiuti Rohlicek & Tsao LLP

(57) ABSTRACT

A method includes generating, using a sensor, a data signal. The data signal includes a first component based on a motion in a first direction of an actuator configured to provide motion between a sample and a probe in the first direction, the first direction substantially in the plane of the sample; and a second component based on at least one of topographic variations of the sample in a second direction, and a materials property of the sample. The method further includes generating, using a processor, a compensatory signal based on the first component of the data signal generated by the sensor; and providing the compensatory signal to the actuator.

33 Claims, 17 Drawing Sheets

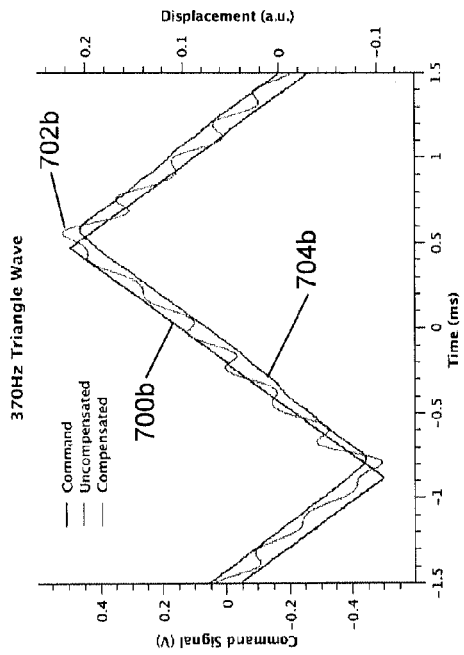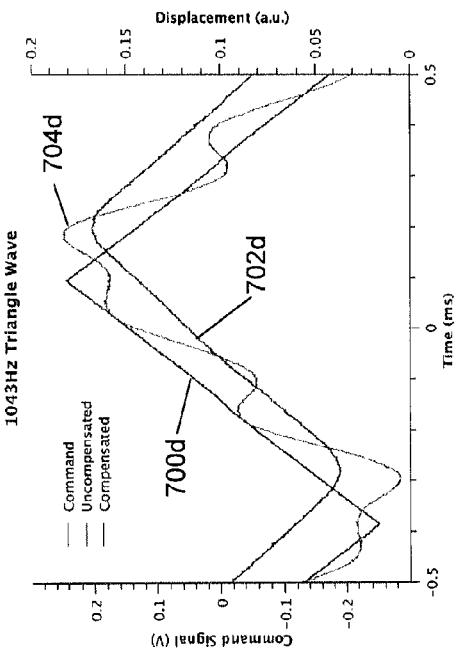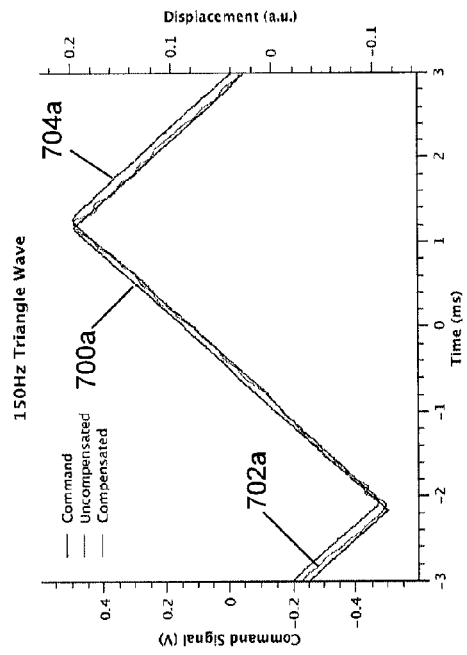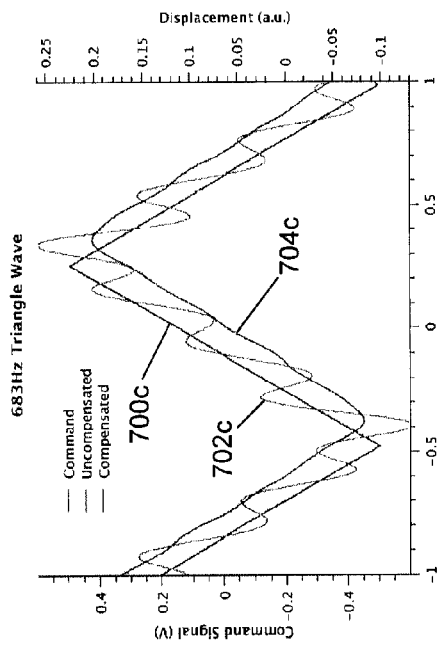

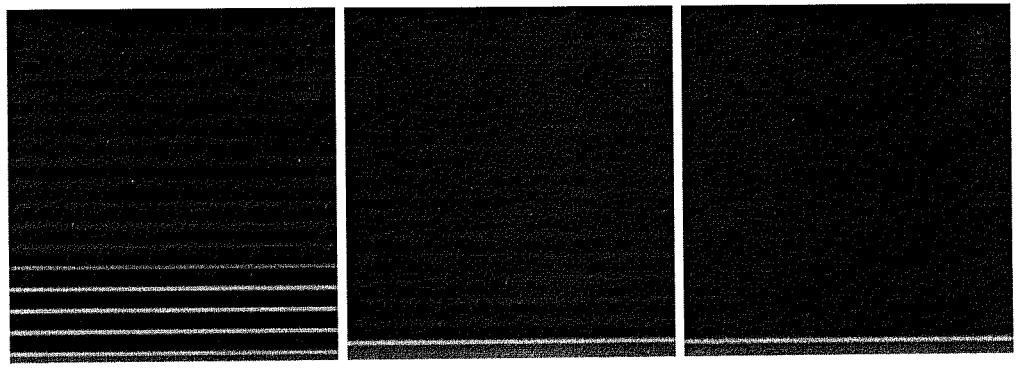
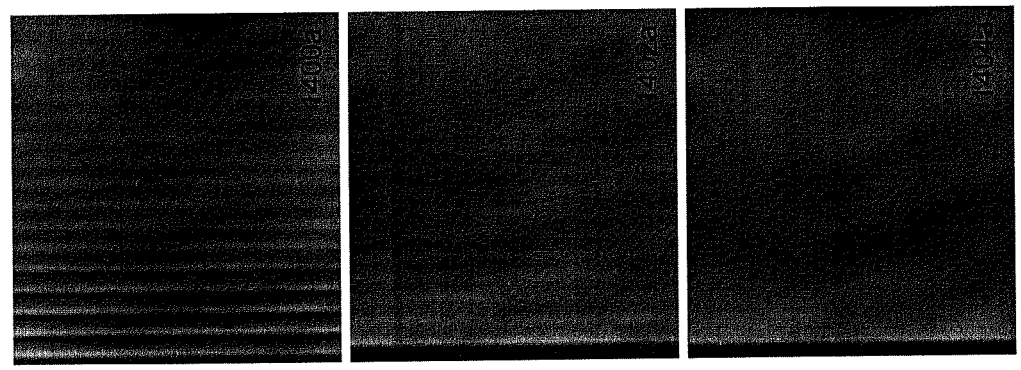
Fig. 14A  Fig. 14B  Fig. 14C

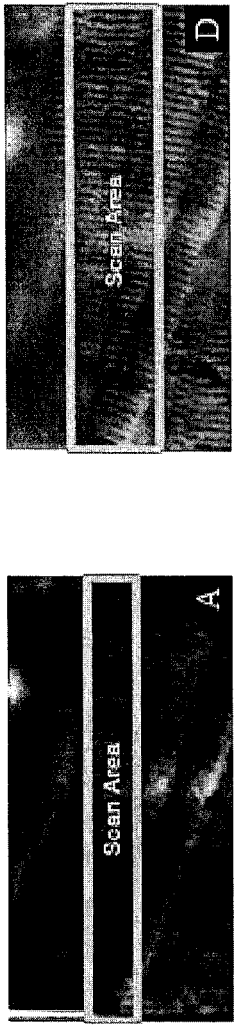
Fig. 15A
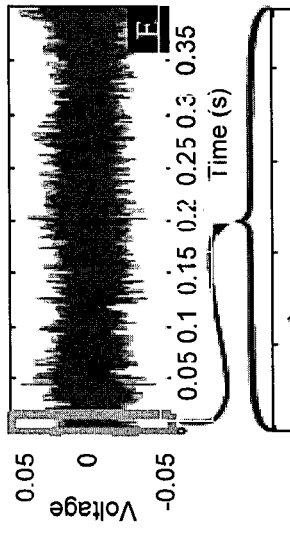
Fig. 15B
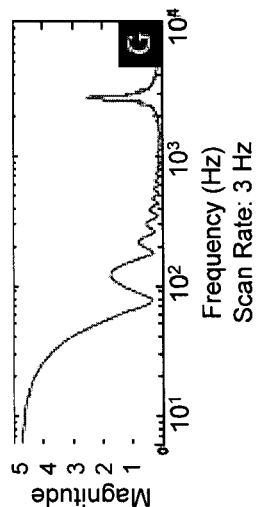
Fig. 15C
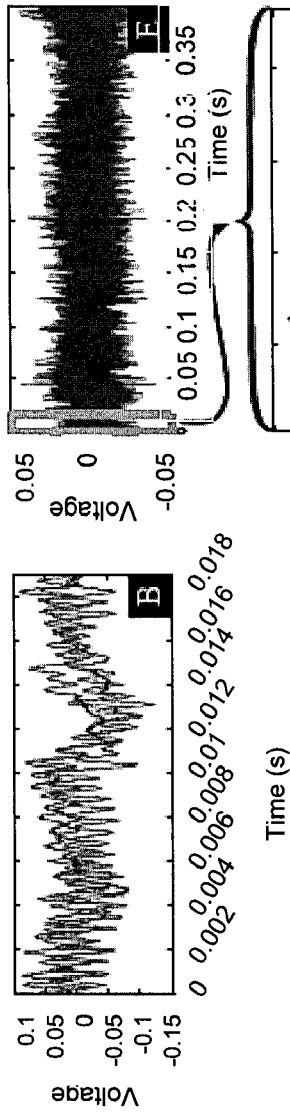
Fig. 15D
Fig. 15E
Fig. 15F
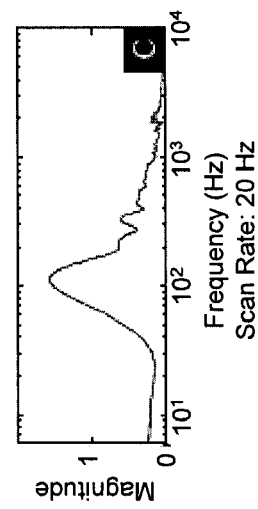
Fig. 15G

RESONANCE COMPENSATION IN SCANNING PROBE MICROSCOPY

BACKGROUND

Scanning probe microscopes (SPMs), such as atomic force microscopes (AFMs) and scanning tunneling microscopes (STMs), are valuable tools for probing the topography and surface properties of materials. At high scan speeds, the scanner that drives the motion of the sample may resonate, causing resonance oscillations to appear in SPM images of the sample. To alleviate these resonance effects, a sensor that directly measures the lateral dynamics of the scanner can be attached to the scanner. A filter accepts the signals from the resonance sensor and employs a full dynamics characterization of the scanner based on the received signals in order to remove the resonance from the scanner motion.

SUMMARY

In a general aspect, a method includes generating, using a sensor, a data signal. The data signal includes a first component based on a motion in a first direction of an actuator configured to provide motion between a sample and a probe in the first direction, the first direction substantially in the plane of the sample; and a second component based on at least one of topographic variations of the sample in a second direction, and a materials property of the sample. The method further includes generating, using a processor, a compensatory signal based on the first component of the data signal generated by the sensor; and providing the compensatory signal to the actuator.

Embodiments may include one or more of the following.

The actuator is a first actuator; and providing the compensatory signal further comprises providing the compensatory signal to a second actuator configured to provide relative motion between the sample and the probe in a third direction not parallel to the first direction, the third direction substantially in the plane of the sample.

The first component of the data signal is based on a resonance of the actuator in the first direction. Generating the compensatory signal includes generating a compensatory signal that at least partially cancels the resonance of the actuator.

Generating the compensatory signal includes identifying the first component of the data signal generated by the sensor. Generating the compensatory signal includes determining at least one parameter for a model of the motion of the actuator.

Generating the data signal includes generating the data signal while the actuator is providing relative motion between the sample and the probe. Generating the compensatory signal includes generating the compensatory signal while the actuator is providing relative motion between the sample and the probe.

The method further includes generating, using a data acquisition module, an image of the sample based on deflection signals received from the sensor.

Generating the compensatory signal includes generating at least two iterations of compensatory signals. Generating at least two iterations of compensatory signal includes generating a second iteration of the compensatory signal based on a response of the actuator to a first iteration of the compensatory signal.

In another general aspect, a system for scanning a sample includes a probe positioned relative to the sample and a scanner including an actuator configured to provide relative motion between the sample and the probe in a first direction substantially in the plane of the sample. The system further includes a sensor configured to generate a data signal based on a property of the sample, the data signal including a first component based on motion in the first direction of the actuator; and a second component based on at least one of topographic variations of the sample in a second direction and a materials property of the sample. The system further includes a compensation module configured to generate a compensatory signal based on the first component of the data signal generated by the sensor and to provide the compensatory signal to the actuator.

Embodiments may include one or more of the following.

The actuator is a first actuator. The scanner further includes a second actuator configured to provide relative motion between the sample and the probe in a third direction not parallel to the first direction, the third direction substantially in the plane of the sample. The compensation module is configured to provide the compensatory signal to the second actuator.

The first component of the data signal is based on a resonance of the actuator. The compensatory signal at least partially cancels a resonance of the actuator.

The compensation module is configured to identify the first component of the data signal generated by the sensor. The compensation module is configured to filter the data signal generated by the sensor and to generate the compensatory signal based on the filtered data signal.

The sensor is configured to generate the data signal while the actuator is providing relative motion between the sample and the probe. The compensation module is configured to generate the compensatory signal while the actuator is providing relative motion between the sample and the probe.

The system is a scanning probe microscope, such as an atomic force microscope.

The actuator includes at least one of a piezoelectric actuator and a mechanical flexure. The sensor is an optical sensor.

The compensation module is configured to generate at least two iterations of compensatory signals.

The compensation module includes at least one of a field programmable gate array (FPGA), a digital signal processor (DSP), and analog circuitry.

In a further general aspect, a method includes receiving a data signal from a sensor, the data signal including: a first component based on a motion in a first direction of an actuator configured to provide motion between a sample and a probe in the first direction, the first direction substantially in the plane of the sample; and a second component based on at least one of topographic variations of the sample in a second direction and a materials property of the sample. The method further includes, based on the data signal, determining, using a processing module, a characterization of the actuator.

Embodiments may include one or more of the following.

Receiving the data signal includes receiving a plurality of line signals, each line signal corresponding to a region of the sample. Determining the characterization of the actuator comprises determining the characterization based on at least some of the plurality of line signals. Determining the characterization of the actuator comprises determining a correlation between at least some of the plurality of line signals. Determining the correlation includes determining the correlation using a time domain model.

Determining the characterization of the actuator includes determining, based on the first component of the data signal, at least one of a plurality of parameters included in a predefined model of the actuator. The parameters included in the predefined model include at least one of a resonance frequency of the actuator and a quality factor of the actuator.

Determining at least one of the plurality of parameters includes not determining all of the plurality of parameters.

The method further includes programming the processing module with the predefined model prior to receiving the data signal. The predefined model includes at least one variable. Determining the characterization of the actuator includes determining the value of the at least one variable.

The method further includes generating, using a compensation module, a compensatory signal based on the characterization of the actuator. The method further includes providing the compensatory signal to the actuator.

Generating the compensatory signal includes generating a compensatory signal that at least partially cancels a resonance of the actuator.

The method further includes determining the characterization of the actuator and generating the compensatory signal while the actuator provides relative motion between the sample and the probe.

Receiving the data signal includes receiving a first data signal representative of relative motion at a first frequency and receiving a second data signal representative of relative motion at a second frequency, the first frequency lower than the second frequency. Determining the characterization of the actuator includes determining the characterization of the actuator based on the first data signal.

The systems and methods described herein have a number of advantages. Resonance compensation allows for high speed and high precision scanning with a scanning probe microscope while removing artifacts of scanner dynamics (e.g., scanner resonances) that would otherwise be present in the resulting images. With clearer images, topographical details of the scanned sample can be readily resolved. The ability to perform high speed imaging enables the study of non-stationary or time-dependent samples, such as live biological specimens.

Model-based filters are developed in real time based on signals that are collected during the imaging of a sample, and specific parameters for the filter are determined based on the collected signals. Because of the real time nature of the filter, the resonance compensation can be adapted to each particular imaging situation. For instance, the resonance frequency of a microscope scanner depends on whether a sample is imaged in an air atmosphere or in a liquid cell. The resonance frequency of a scanner may also drift due to wear or environmental factors such as temperature or humidity. With real time modeling and filtering, the resonance compensation approach can be customized for each unique imaging environment without the need for user intervention and without the need for a separate system identification experiment to be performed. Furthermore, the real-time strategy of scanner characterization allows aggressive model-inversion filters to be designed that do not need to accommodate the wide variability of possible dynamics traditionally associated with robust control.

A resonance compensation module can be applied as a simple and inexpensive retrofit to existing scanning probe microscopes. The resonance compensation module is versatile and can be used with various brands and models of scanning probe microscopes.

Other features and advantages of the invention are apparent from the following description and from the claims.

BRIEF DESCRIPTION OF DRAWINGS

FIGS. 7A-7D are plots of a scan command signal and the compensated and uncompensated responses of an AFM scanner for scan frequencies of 150 Hz, 370 Hz, 683 Hz, and 1043 Hz, respectively.

FIG. 9B is a plot of the boxed region of FIG. 9A.

FIGS. 14A-14C are AFM height and deflection images with iterative compensation applied, for a scan frequency of 30 Hz.

FIGS. 15A, 15B, and 15C are an AFM image, a scan line trace plot, and a discrete time Fourier transform, respectively, of rat tail collagen imaged at 20 Hz.

FIGS. 15D, 15E, 15F, and 15G are an AFM image, two scan line trace plots, and a discrete time Fourier transform, respectively, of rat tail collagen imaged at 3 Hz.

DETAILED DESCRIPTION

Figure 1:
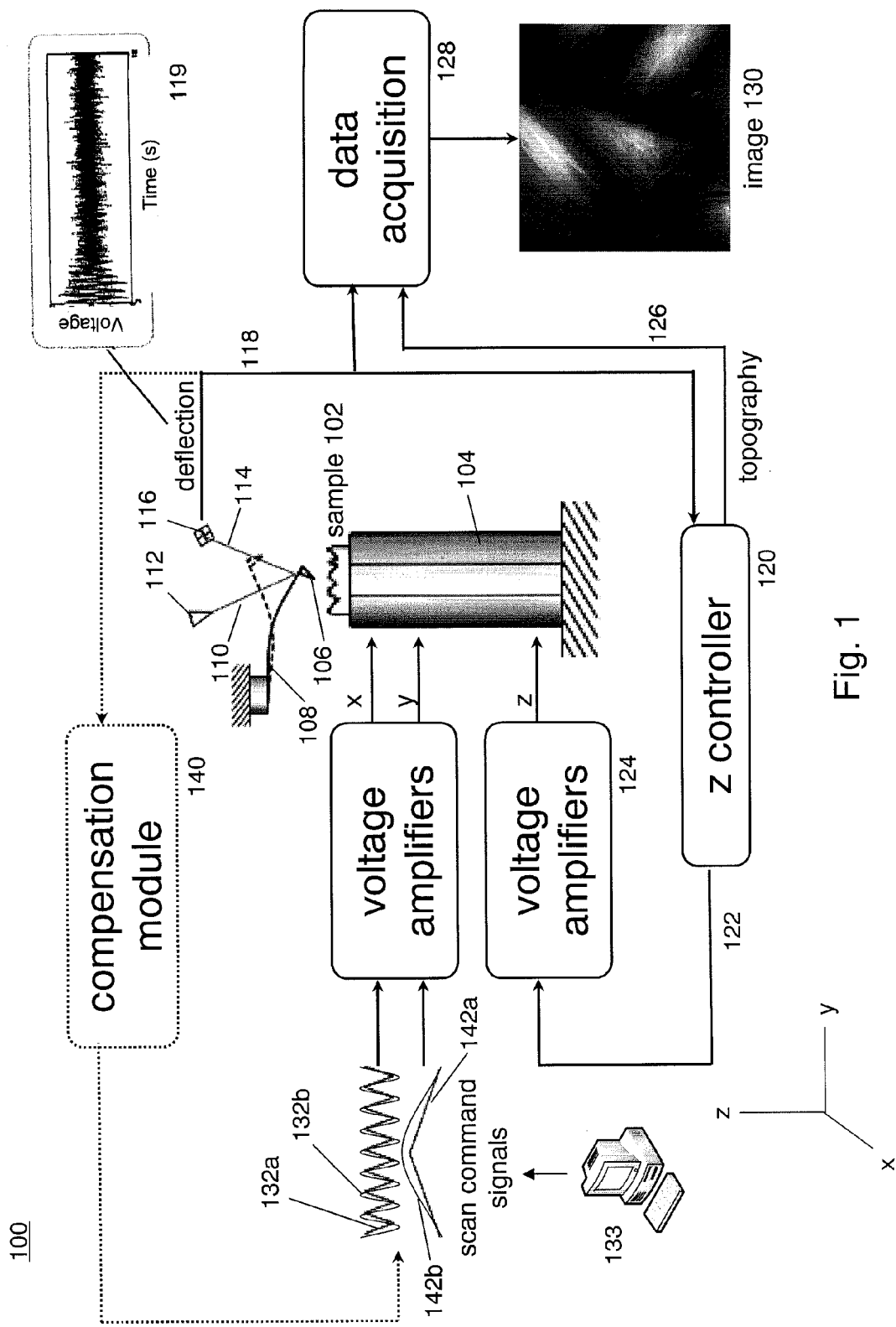
FIG. 1 is a block diagram of an atomic force microscope (AFM).

Referring to FIG. 1, an atomic force microscope (AFM) 100 images the topography or other surface properties of a sample 102. Sample 102 is scanned in the X and Y directions (i.e., in the plane of the sample) by a scanner 104, which contains piezoelectric actuators that provide X and Y motion to the sample. An example of a suitable scanner 102 is, for instance, an "E" or a "J" scanner (Veeco Instruments, Inc., Santa Barbara, Calif.). As the sample is scanned, the sample is moved in the X and Y directions relative to a tip 106 of a cantilevered probe 108 positioned above the sample. Probe 108 deflects in response to topographical variations on the surface of sample 102. AFM 100 may be operated in intermittent contact mode (also known as TappingMode™), in which probe 108 is oscillated at or near its resonance frequency (indicated by a dashed line probe 103) at its resonance frequency; or in contact mode, in which probe 108 does not oscillate. In other embodiments, sample 102 is held stationary and probe 108 is moved in the X and Y directions by a scanner, or a combination of both the probe and the sample are scanned. In still other embodiments, other types of relative motion between the sample and a sensing tip, such as deformation of a cantilever relative to the sample, are performed.

A laser beam 110 generated by a laser 112 is focused on the end of probe 108. The laser beam is reflected by the probe and a reflected beam 114 is received by a detector 116. When probe 108 deflects in response to topographical features or other variations on the surface of sample 102, the position at which the reflected beam 114 strikes detector 116 changes. Deflection signals 118 (shown as a scan line trace 119) representative of the deflection of probe 108 as it is scanned across sample 102, and thus indicative of the topography of sample 102, are output from detector 116 and fed into a Z-axis controller 120. Z-axis controller operates within a feedback mechanism that controls the Z-axis motion of scanner 104 and thus the separation between sample 102 and the tip 106 of probe 108. For instance, if AFM 100 is operated in constant force mode, Z-axis controller 120 maintains a constant separation between sample 102 and tip 106 despite topographical variations on the surface of sample 102. To implement this feedback control, Z-axis controller 120 outputs Z-axis control signals 122 based on the received deflection signals 118. Z-axis control signals 122 are amplified by a voltage amplifier 124 and sent to scanner 104, directing the scanner to move sample 102 in the Z direction in order to maintain the desired tip-sample separation.

The surface topography is measured by the up and down motion commands sent from Z-axis controller to a tube scanner 104 that provides Z-axis motion to the sample 102. Topography signals 126 based on the Z-axis control signals 122 are output from Z-axis controller 120, received by a data acquisition module 128, and used to form a topographical image 130 of the scanned region of sample 102. More specifically, the topographical image 130 is generated based on how Z-axis control signals 122 command scanner 104 to extend in order to hold some property of probe 108 constant (e.g., static deflection for contact mode; RMS oscillation amplitude or phase relative to the X-axis command signal for intermittent contact mode). In some cases, the raw deflection signals 118 are also received by data acquisition module 128 and used to form a deflection image (not shown) for the scanned region of sample 102. Deflection images often capture features of sample 102 at high spatial frequencies, which are measured by probe 102 but not tracked by the feedback system.

Figure 2:
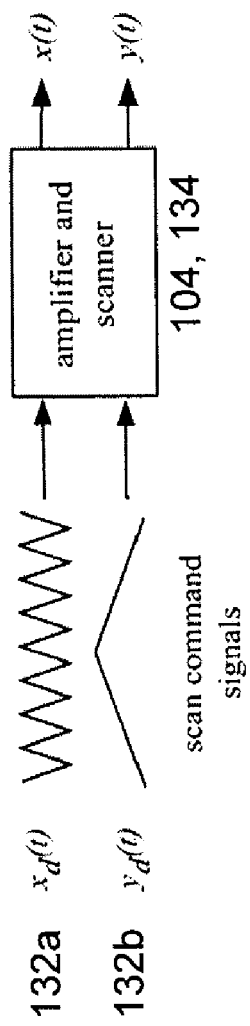
FIG. 2 is a block diagram of the operation of a conventional AFM.

Referring to FIGS. 1 and 2, the X and Y direction motion of scanner 104 is controlled by an X-axis scan command signal $x_d(t)$ 132a and a Y-axis scan command signal $y_d(t)$ 132b, which are provided, for instance, by a computer 133. The scan command signals 132a, 132b are amplified by a voltage amplifier 134 and applied to scanner 104. Scan command signals 132a, 132b are triangular wave signals that control the actuation of the X-axis and Y-axis piezoelectric actuators in scanner 104, and thus control the X direction and Y direction motion (x(t) and y(t), respectively) of sample 102. In the example shown, the fast scan direction is controlled by X-axis scan command signal 132a and the slow scan direction is controlled by Y-axis scan command signal 132b.

Figure 3:
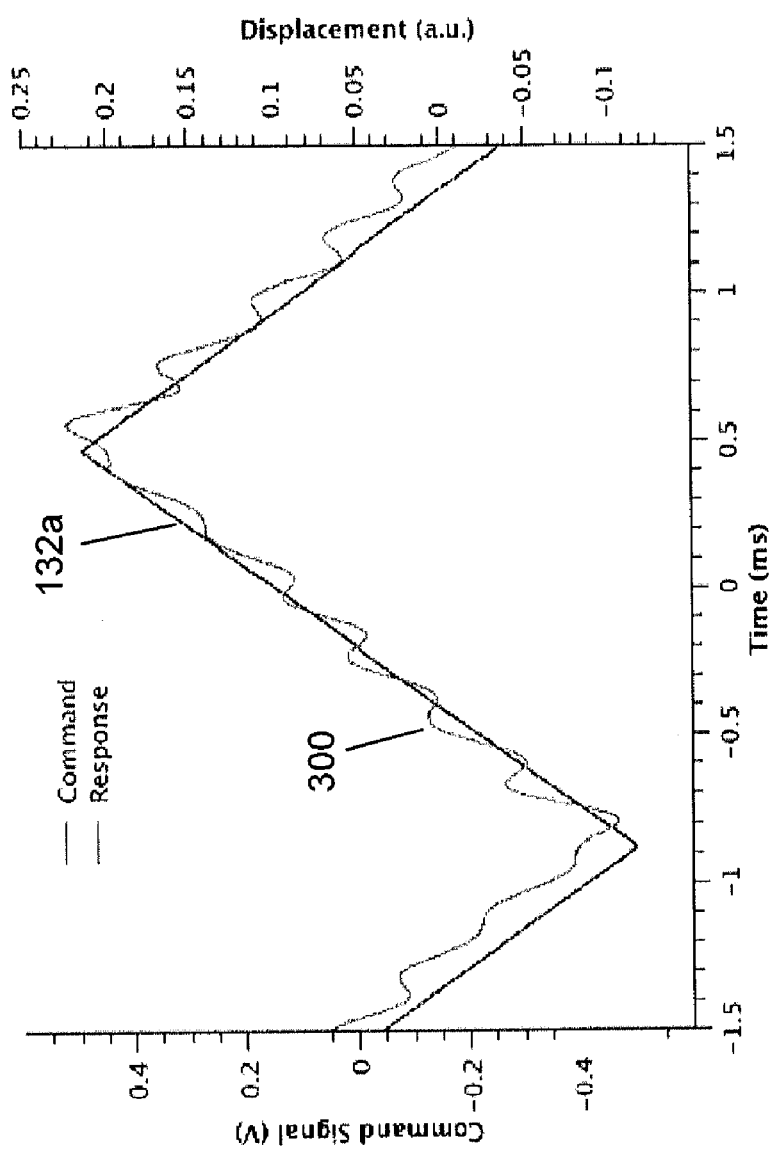
FIG. 3 is a plot of a scan command signal and the response of an AFM scanner

Referring to FIG. 3, when the triangular wave X-axis scan command signal 132a is applied to the scanner, the piezoelectric actuator in the scanner responds by causing the sample to move in the X direction. However, when scan command signal 132a has a frequency content that is near the resonance frequency of the X-axis piezoelectric actuator, the actuator resonates. That is, the actual displacement of the piezoelectric actuator does not track the desired triangular shape due to resonances that are excited in the tube. Resonance oscillations are thus superimposed on the original triangular wave pattern of the command signal, as shown in curve 300. These resonance oscillations affect the motion of the sample and appear as distortions in the resulting image. More specifically, the lateral resonance of the piezoelectric actuators in scanner 102 couples into the vertical axis and is detected by the cantilever deflection signal, making this disturbance appear as topographic features. If the Z feedback control bandwidth is high enough, the piezoelectric actuators will attempt to track this output disturbance, and the same artifacts will corrupt the topography signal as well. That is, coupling exists in the scanner whereby distortions in the X-Y plane disturb the behavior of the scanner in the out-of-plane (Z) direction. Each new scan line re-excites the resonance. For a typical piezoelectric actuator, such resonances are excited at high scan speeds, e.g., greater than about 10 Hz.

Figures 4A, 4B, 4C:
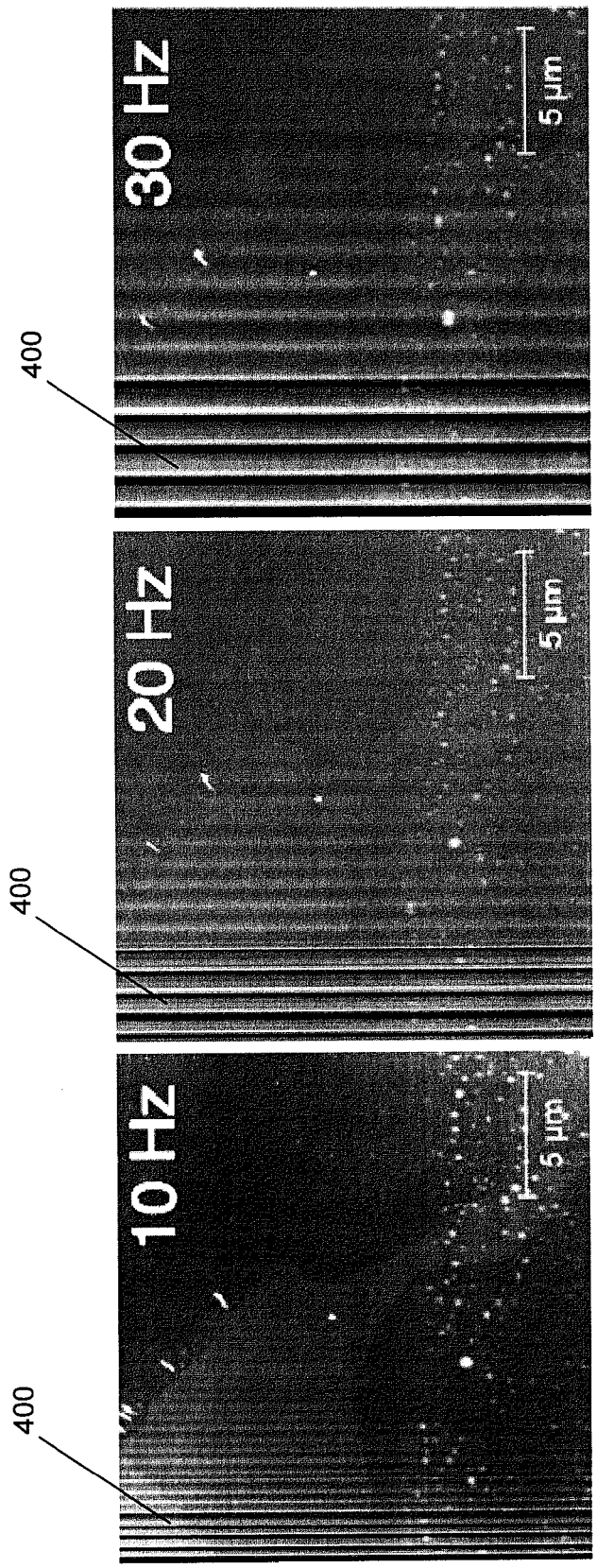
FIGS. 4A-4C are AFM images of mica taken at scan frequencies of 10 Hz, 20 Hz, and 30 Hz, respectively.

Referring to FIGS. 4A-4C, AFM images of atomically flat mica were captured at scan frequencies of 10 Hz, 20 Hz, and 30 Hz, respectively. The fast scan direction is from left to right; that is, each scan line starts at the left side of the image and finishes at the right side. Resonance distortions 400 are visible at all three scan frequencies and, at higher frequencies, obscures the surface features of the imaged sample. The temporal frequency of the resonance is constant regardless of scan speed. However, as the scan speed increases, a larger region of the sample is scanned during the time of each resonance oscillation. Thus, the spatial frequency of the resonance lines decreases with increasing scan speed (i.e., the resonance oscillations appear larger). Additionally, at higher scan frequencies, the resonance lines occupy a larger area of the image. This is because the scanner resonance is excited at the beginning of each fast scan line (in this case, at the left of the image) and is slowly dampened along the scan line. However, because the damping time is the same regardless of the scan speed, more of the scan line is completed at faster scan speeds by the time the resonance is dampened.

Scanner coupling originates primarily from two sources: (i) through topographic variation and (ii) through dynamic coupling of the scanner. The former, which generally makes a minor contribution to coupling, is a result of lateral positioning errors that cause the probe to interact with a different location on the sample. If the topography has a sufficiently large slope such that the change in height is on the order of the lateral positioning error, then lateral resonances will cause a measurable disturbance in the Z direction. The more prominent source of lateral disturbances stems from the dynamic coupling inherent to the positioning actuator. That is, lateral ringing is measurable in the vertical direction by virtue of the fact that the positioning axes of the piezoelectric actuators are not orthogonal.

Referring again to FIG. 1, in order to compensate for the natural tendency of the scanner to resonate, a compensation module 140 is enabled in AFM 100. Compensation module 140 receives deflection data 118 and implements a filtering algorithm in real time (i.e., during a scan) based on that deflection data. The output of compensation module 140 is an altered set of scan command signals 142a, 142b that do not excite the resonances of the piezoelectric actuators in scanner 104. Compensation module 104 may be implemented with, for instance, a field-programmable gate array (FPGA), a digital signal processor (DSP), or passive or active analog circuitry.

Figure 5:
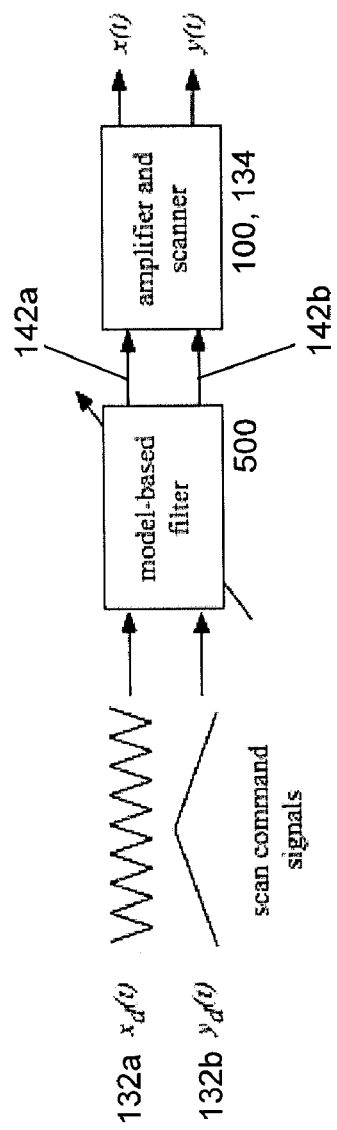
FIG. 5 is a block diagram of the operation of the AFM of FIG. 1.

Referring to FIGS. 1 and 5, more specifically, triangular wave scan command signals 132a, 132b are received by a model-based filter 500 implemented in compensation module 140. Filter 500 also receives deflection data 118 collected during the scanning of sample 102. As discussed above, information about the lateral dynamics of the scanner is observable in the deflection signal, and thus the objective of filter 500 is to extract enough information from the deflection signal to fit the model. More specifically, filter 500 is a model-based input shaper that implements an inversion of the scanner's lateral dynamics with suitable roll-off, filters the deflection data 118 in real time to extract the components of the data that are due to scanner resonance and generates filtered scan signals 142a, 142b based on the results of the filtering. The filtered scan signals do not excite the resonances of the piezoelectric actuators in scanner 104. Filtered scan signals 142a, 142b are amplified by amplifier 134 and sent to scanner 104, where they are used to control the motion of sample 102. In some cases, filter 500 employs a self-learning iterative approach in which parameters of the model are continually overwritten as the effectiveness of the compensation is evaluated.

The dynamics of scanner 104 are expected to vary with sample mass, experiment type, and over time as the environment of the piezoelectric actuators changes. Thus, a reprogrammable filter is desirable. In the case of an FPGA capable of quickly processing high speed signals (e.g., an FPGA from National Instruments, Austin, Tex.), compile times for reprogramming are typically more than 20 minutes, which is not compatible with the real-time filtering implemented by filter 500. Thus, as described in more detail below, a general filter structure is programmed into the FPGA. Coefficients and gains of the filter are left as variables that can be quickly updated via a network-connected computer. In this manner, recompiling the FPGA can be avoided and the filter equation can be updated in only a few milliseconds.

Figures 6A, 6B:
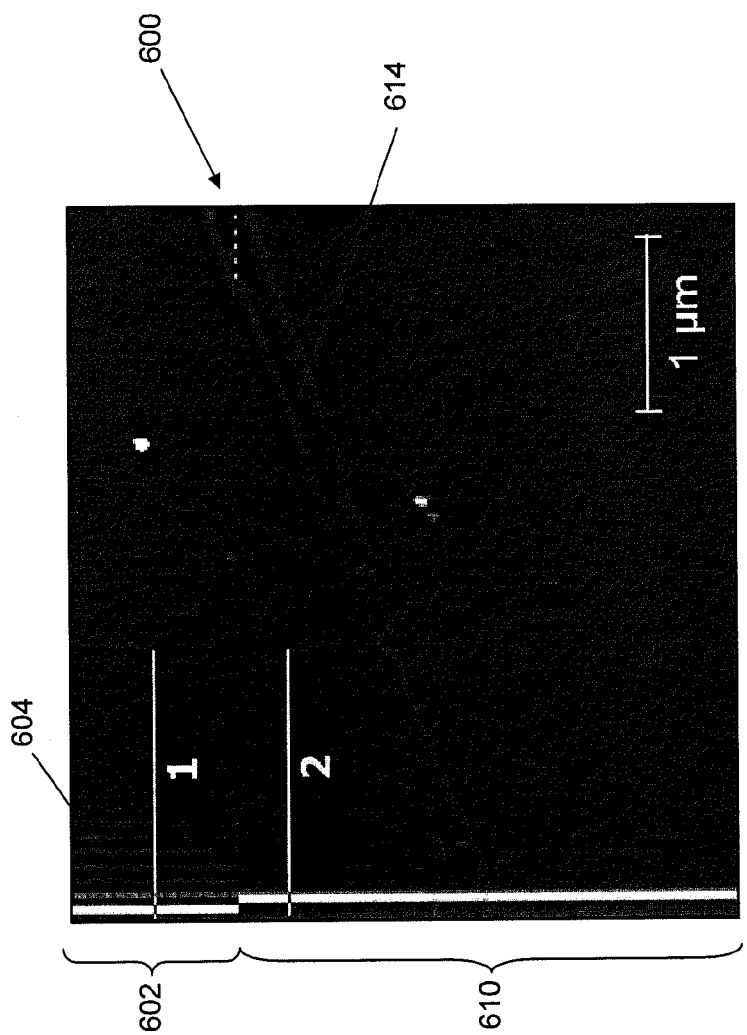
FIG. 6A is an AFM image of scratched mica.
FIG. 6B is a plot of scan line traces along lines 1 and 2 of the AFM image of FIG. 6A.

Referring to FIGS. 6A and 6B, an AFM deflection image 600 was taken of a scratched mica surface. In a first portion 602 of the image, filter compensation was not used. Resonance oscillations 604 are seen in the image. A scan line trace 606 along horizontal line 1 in unfiltered portion 602 shows oscillations 608 corresponding to the resonance oscillations 604 in the image. During the scan, the real-time filter was enabled; a second portion 610 of the image shows the effects of the filtering. The resonance oscillations are eliminated and a scan line trace 612 along horizontal line 2 confirms that no resonance oscillations are present in the filtered region.

Referring to FIGS. 7A-7D, triangular wave scan command signals 700a, 700b, 700c, and 700d are provided to an AFM scanner at 150 Hz, 370 Hz, 683 Hz, and 1043 Hz, respectively. The uncompensated response of the scanner is shown as curves 702a, 702b, 702c, and 702d. Resonance oscillations are present in the motion of the scanner and vary in amplitude depending on the scan frequency. When the real-time model-based filter is enabled, filtered scan command signals (not shown) are sent to the scanner. The response of the scanner to the filtered scan command signals is shown as curves 704a, 704b, 704c, and 704d. Resonance oscillations present in the unfiltered motion are no longer present in the filtered response, and the filtered responses match the corresponding originally provided scan command signals 700a, 700b, 700c, and 700d fairly accurately. The AFM scanner used to generate these results is a high-speed scanner capable of scanning at frequencies of 150-1000 Hz. However, similar results can also be achieved for filter compensation with conventional AFM scanners, which are generally capable of scanning at frequencies below about 100 Hz.

The equations implemented by filter 500 are informed by a mathematical approximation of the dynamics of scanner 104. The details of the scanner dynamics are determined using an algorithm discussed in greater detail below. In general, a basic structure of the scanner model is predetermined and programmed into filter 500. However, the specific details of the model are calculated in real-time in order to allow for variations in the properties of the particular scanner, sample, and imaging environment. The real time capabilities of the model allow the filter to be customized for each imaging session, e.g., to account for the drift in scanner resonance frequency over time or with environmental conditions. Additionally, real-time modeling allows the model to be easily adjusted for unique experimental situations, such as an unusually heavy sample or a sample that is imaged in liquid, both of which affect the resonance frequency of the scanner For example, the frequency at which a particular scanner resonates may nominally be 1000 Hz, but may vary by 10-20% or even more, depending on properties of the scanned mass. An FPGA in compensation module 140 is programmed to implement the equations for a model-based filter based on the nominal resonance frequency of 1000 Hz, while the coefficients of the equations are left as variables to be updated in real time (i.e., while AFM 100 is scanning) for each individual sample or imaging session. Programming the compensation module with a predetermined general structure of a scanner model, followed by real-time determination of the coefficients in the model, also avoids the lengthy compile time that would be associated with altering the fundamental structure of the model in the compensation module.

In an alternative embodiment, compensation module 140 includes a computer that computes filtered scan signals 142a, 142b offline (i.e., not in real time) based on a previously determined model of the scanner dynamics and on deflection data obtained during a previous scan. At the time of imaging, the computed signals 142a, 142b are inputted into scanner 104. Because the filtered scan signals are computed offline, high speed filtering hardware is not used.

Figure 8:
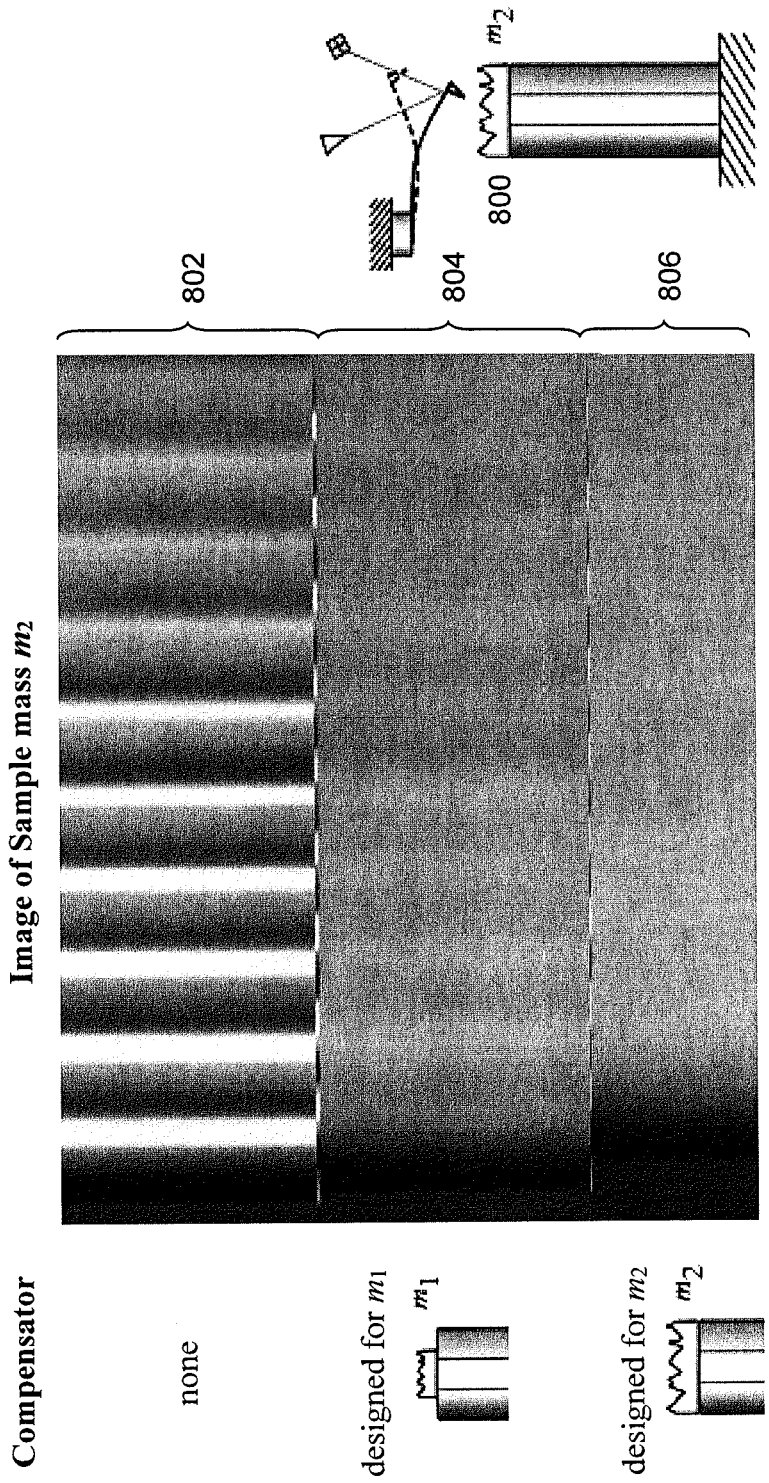
FIG. 8 is an AFM image of mica taken under different filter conditions.

Referring to FIG. 8, to demonstrate the importance of real-time filter adaptation to a particular sample or imaging environment, a sample 800 with a mass $m_2$ is imaged with an AFM under three different filtering conditions. In a first region 802 of the image, the AFM is operated with no filter compensation. As expected, resonance oscillations are prominent in the image. In a second region 804, a filter is used that includes precomputed scan command signals optimized for a sample mass of $m_1$ different from $m_2$. Because the filter is not specific to the sample being imaged, the filter is not able to completely compensate for the resonance of the scanner, and faint resonance oscillations are still observed. However, when the AFM is operated with a filter specific to the actual mass of the sample, as shown in a third region 806, the resonance oscillations are successfully removed from the image. Although the filtered regions 804 and 806 were filtered with precomputed models, the importance of real-time filtering is clear: a model that is predetermined with incorrect parameters will not be able to completely eliminate the resonance oscillations for any but the exact scanning environment for which the model parameters were determined.

Figure 9A:
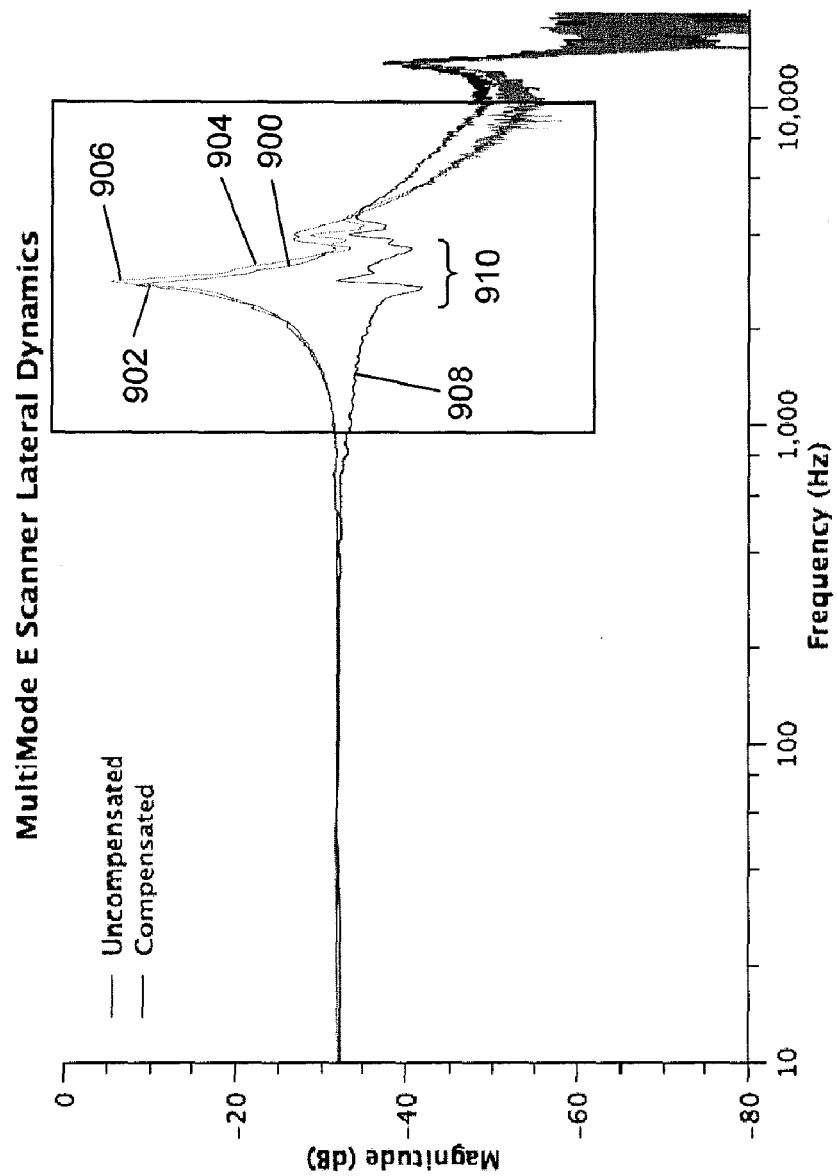
FIGS. 9A and 9B are plots of the lateral dynamics of an AFM scanner
Figure 9B:
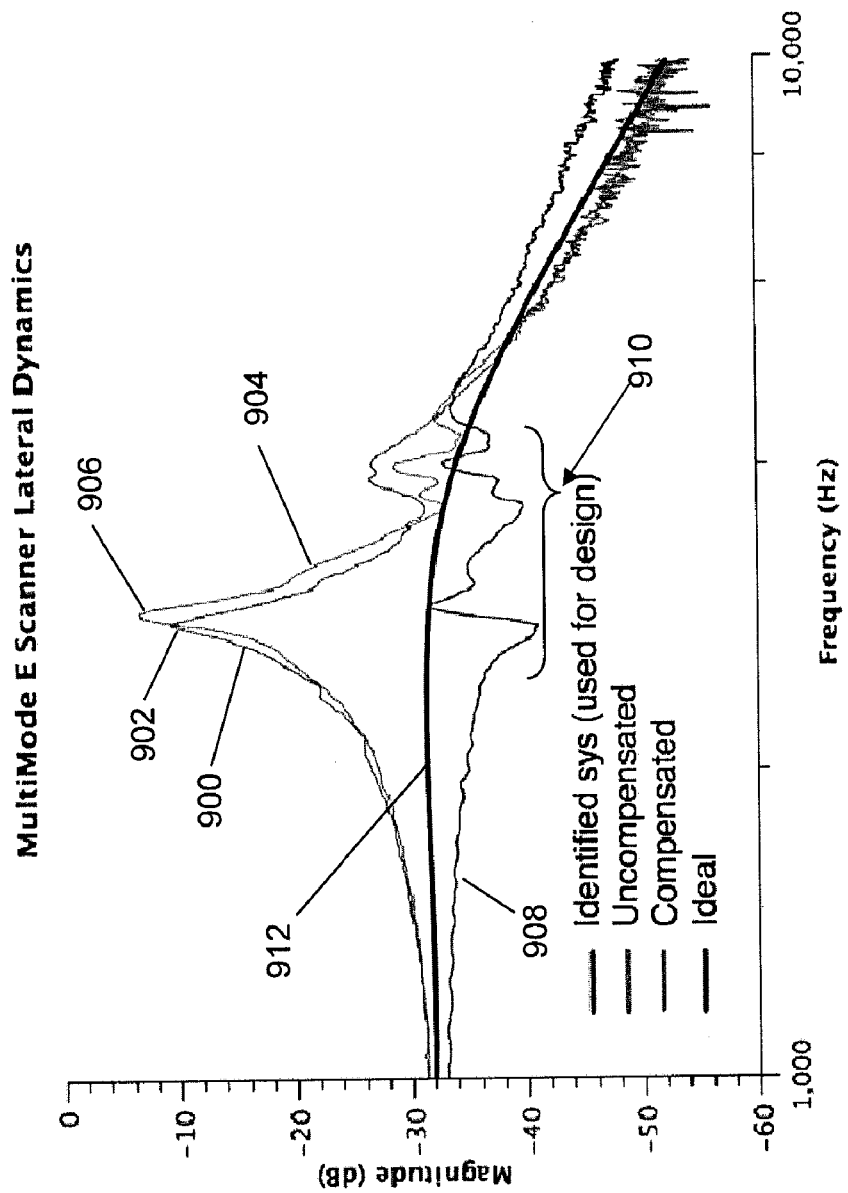

Referring to FIGS. 9A and 9B, to further demonstrate the importance of real-time filter adaptation, a model was constructed based on a scanner having the lateral dynamics shown in curve 900. The resonance of the scanner is seen as a peak 902 at roughly 3 kHz. If the constructed model was applied to the scanner exhibiting exactly the dynamics shown in curve 900, the resulting compensated frequency domain response would be a flat line 912 that begins to decrease slightly around 3.5 kHz. However, the dynamics of a scanner often shift slightly over time, due to ordinary drift or environmental factors (e.g., temperature or humidity). Thus, the lateral dynamics of the same scanner with the same sample are different at another point in time, as shown in curve 904. Although the resonance of the scanner (shown as a peak 906) is in approximately the same position as resonance peak 902, there are slight differences between curves 902 and 904. When the model (constructed based on curve 900) is applied to the scanner exhibiting the dynamics of curve 906, a complex compensated frequency domain response 908 arises due to a mismatch in the modeled scanner dynamics and the filter dynamics of the actual scanner. Specifically, a dip and a peak 910 in the compensated response will affect the success of the filter at removing the resonance oscillations from the resulting AFM image.

The generation of compensated scan command signals is a multi-step process. The deflection signal (or a signal from another Z-axis sensor) that is taken as input into the filtering algorithm is a superposition of several effects: topography or other local surface properties of the sample, influences from the Z-axis controller (120 in FIG. 1), nonlinearity and noise inherent in the deflection sensor, and scanner dynamics. The goal of the filtering algorithm is to separate the portion of the deflection signal that is due to scanner dynamics from the portion of the deflection signal that arises from other sources.

Figures 10A, 10B:
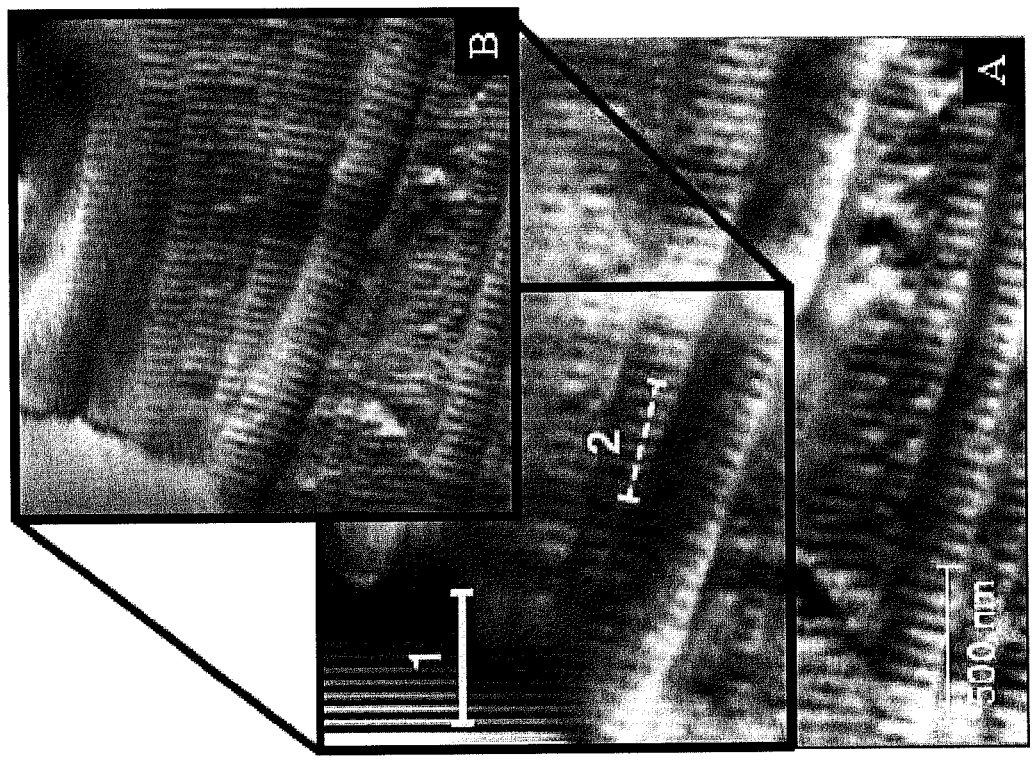
FIGS. 10A and 10B are AFM images of rat tail collagen taken at 10 Hz without compensation and with compensation, respectively.
Figure 11:
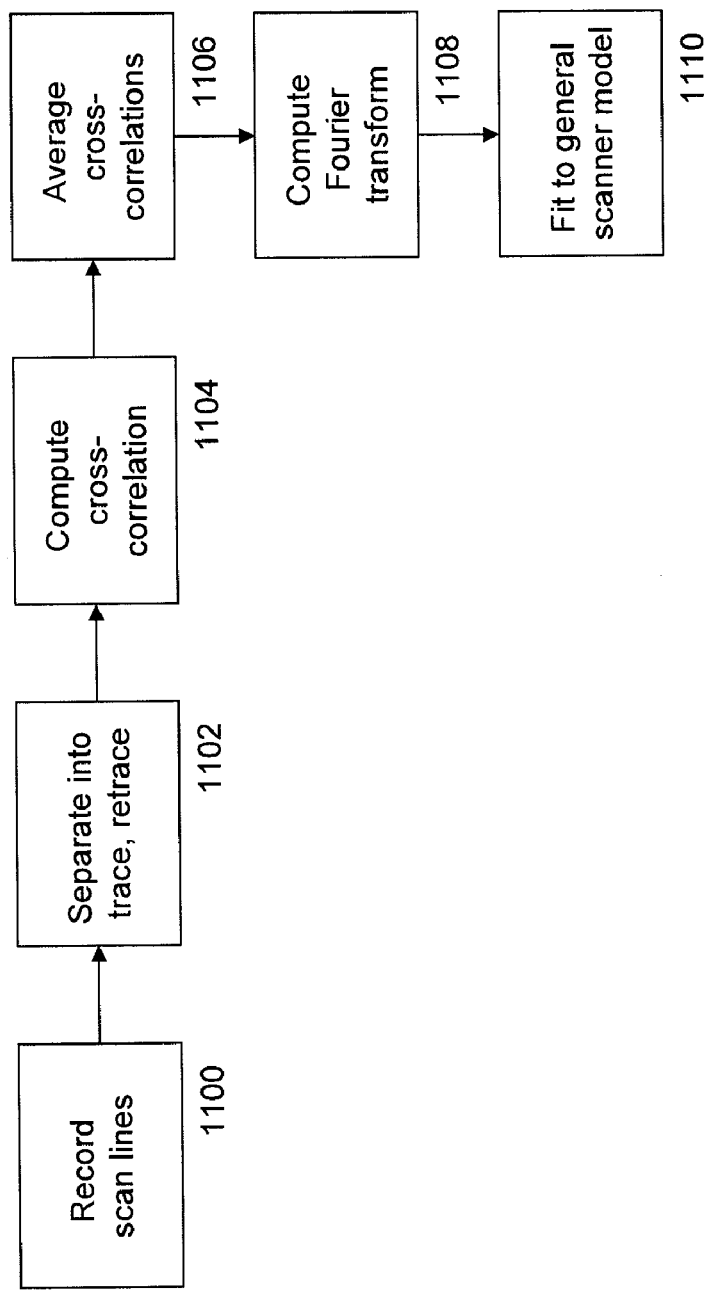
FIG. 11 is a flow chart of the compensation process.
Figure 12A:
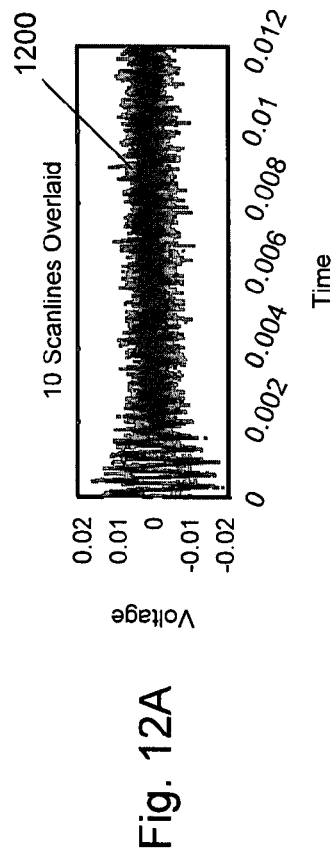
FIGS. 12A-12F are AFM scan line plots representing steps in the compensation process.
Figure 12B:
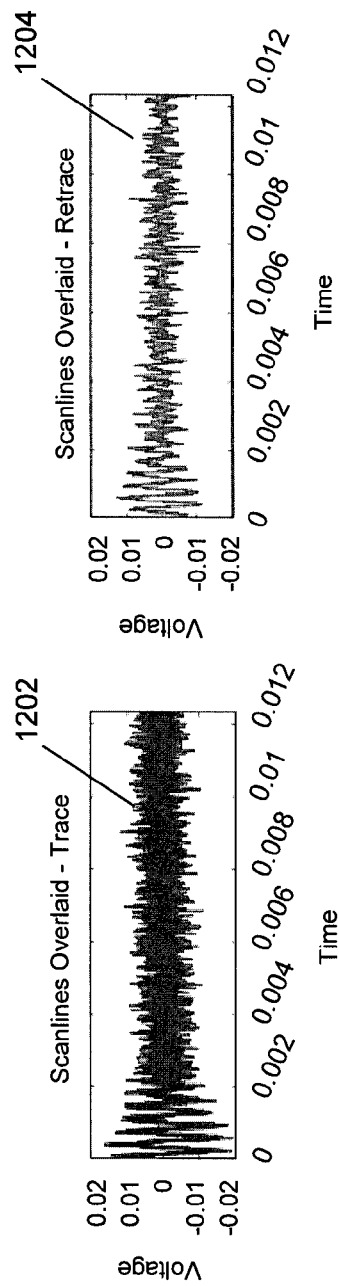
Figure 12C:
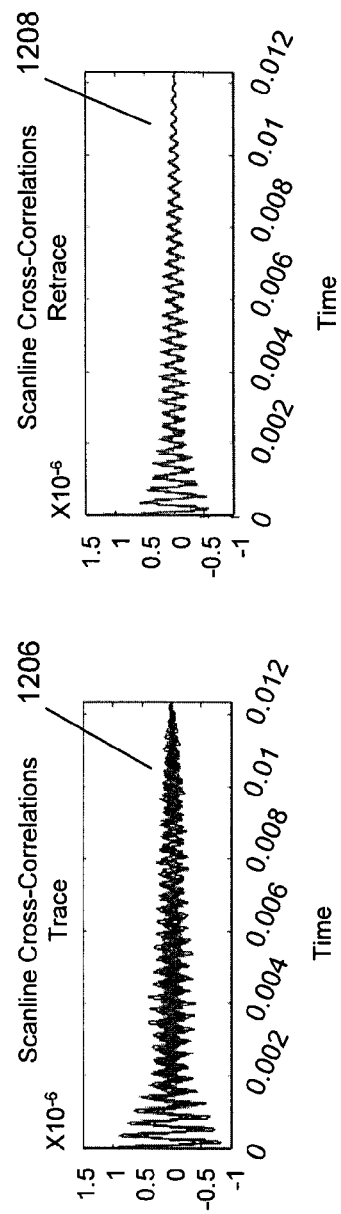
Figure 12D:
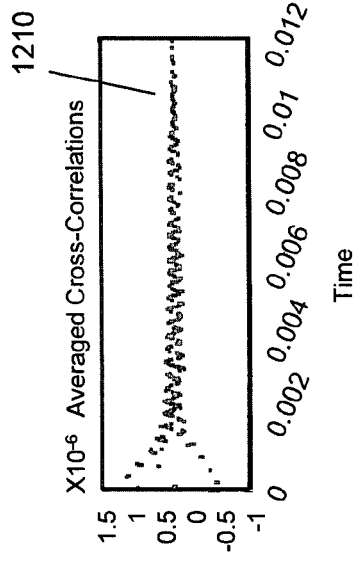
Figure 12E:
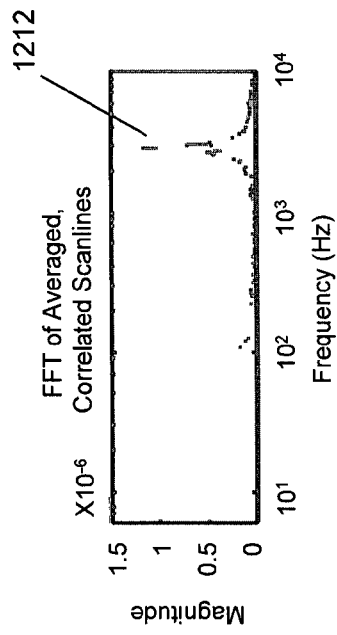
Figure 12F:
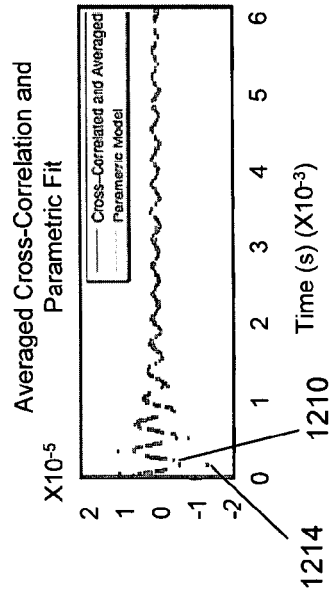

In some cases, the scanner dynamics may not be the only factor that causes features to appear in the deflection signal at the resonance frequency of the scanner. For instance, referring to FIGS. 10A and 10B, AFM height and deflection images, respectively, were collected simultaneously for a sample of rat tail collagen at a scan speed of 20 Hz. At some scan speeds, the topographical characteristics of rat tail collagen have a frequency similar to the resonance frequency of the scanner. Thus, extracting only the scanner dynamics signal from the deflection signal is not as simple as filtering out all but the expected resonance frequency or frequencies of the scanner. Rather, the algorithm takes into account the possibility that topographical or other factors may be easily confused with resonance oscillations.

In general, the filtering algorithm is based on the recognition that, over several scan lines, the disturbances due to scanner resonance are correlated, while in general the topography, noise, and other effects present in the deflection signal do not show the same correlation. The correlation of the resonance disturbances can be observed, for instance, in the first portion 602 of the image in FIG. 6A. The resonance oscillations are manifested as vertically oriented streaks that keep the same position from one scan line to the next. The filtering algorithm is thus based on the mathematical notion of cross-correlation and is design to cross-correlate the scan lines with each other. In this manner, the part of the deflection signal that is due to mechanical resonances of the scanner is emphasized while other effects are suppressed. In other embodiments, alternative approaches are used that do not rely on cross-correlation of scan lines.

Referring to FIGS. 11 and 12A-12F, to implement the filtering algorithm, several scan lines (e.g., 10 scan lines) are recorded and aligned onto one graph 1200 (step 1100). K scan lines of trace and retrace data are recorded as individual vectors:

$$[\vec{z}_1, \ldots, \vec{z}_K].$$

The scan lines are then separated into trace scan lines 1202, or left-to-right scans, and retrace scan lines 1204, or right-to-left scans (step 1102):

$$[\vec{z}_1, \ldots, \vec{z}_P][\vec{z}_2, \ldots, \vec{z}_{K-P}].$$

The cross-correlations of adjacent trace scan lines 1206 and of adjacent retrace scan lines 1208 are computed (step 1104):

$$\forall \vec{z}_i$$

$$R_{z_i, z_{i+1}}(m) = \frac{1}{N} \sum_{n=0}^{N-m-1} z_{i,n+m} \cdot z_{i+1,n}, \, m \geq 0$$

where m denotes correlation lag. The cross-correlation removes most of the influence of noise and topography and leaves a signal that begins to represent the scanner dynamics.

The results from both cross-correlation components 1206, 1208 are averaged to smooth the data and to remove further influence of noise and topography (step 1106). This averaging results in a singular data trace y(m) 1210, whereas the results for previous steps included multiple traces overlaid:

$$t(m) = \frac{1}{K-1} \sum_{i=1}^{N-m-1} R_{z_i, z_{i+1}}(m), \, m \geq 0.$$

A discrete time Fourier transform $f_n$ 1212 of the averaged data t(m) is computed in order to identify the dominant frequency f of the resonance disturbance (step 1108):

$$T(f) = \sum_{m=0}^{N-1} t(m) \exp(-j 2\pi f m / N)$$

$$f_n = \mathrm{argmax} T(f).$$

A predetermined general model 1214 of the scanner is then fit to the averaged trace 1210 (step 1110). The fit results in the parameters that are used to design the model-based filter. This fitting operation depends strongly on the initial guesses for the model parameters. Thus, the dominant frequency f can be used as an initial guess for the disturbing frequency in order to improve the likelihood of a successful fit. Bounding other parameters to positive, real values, the parameters of a damped sinusoid s(m) are fit to t(m):

$$s(m) = A \exp(-2\pi f \zeta m)$$

$$\cos\left(2\pi f \sqrt{1-\zeta^2}\, m + \phi \min_{A, f, \zeta, \phi} \sum_{m=0}^{N} (s(m) - t(m))^2 \to \{A, f, \zeta, \phi\}.\right.$$

The fitting methodology is Levenberg-Marquardt, which is an algorithm designed to find the parameters that minimize a function, in this case the sum of the squared error. The resulting parameters describe an underdamped, second-order differential equation. This fitting step yields the parameters {A, f, ζ, φ}, which are the amplitude, undamped frequency, damping coefficient, and phase of s(m).

In alternative approaches to determining a model of scanner dynamics, Kalman filtering or other filtering methods are used to estimate the dynamics of a system using a combination of a noisy sensor (the displacement data) and an uncertain model (the model of the basic scanner structure).

Although the fitting algorithm provides four parameters, not all four parameters are necessarily required for compensation. By not requiring an information-complete estimation of the full system, the likelihood can be increased that the minimal system ID experiment produces useful results in the presence of a strictly under-excited system whose output is measured indirectly. This method is denoted "minimal identification" to distinguish it from the traditional information-complete system identification that strives to account for the maximum variation in the recorded input-output data of an unknown system. By admitting a less-than-complete system description, a much less onerous experiment can be performed to identify lateral dynamics while still providing sufficient information about the scanner to inform the design of a low-order model-based compensator.

Specifically, the amplitude A and the phase φ of the input-output model s(m) are not necessarily needed for compensation. Instead, compensation can be performed knowing only the damped natural frequency $\omega_d$ and the Q factor of the scanner resonance, and therefore good estimation for only the undamped frequency f and the damping ratio ζ care used from the identification algorithm.

Figure 13A:
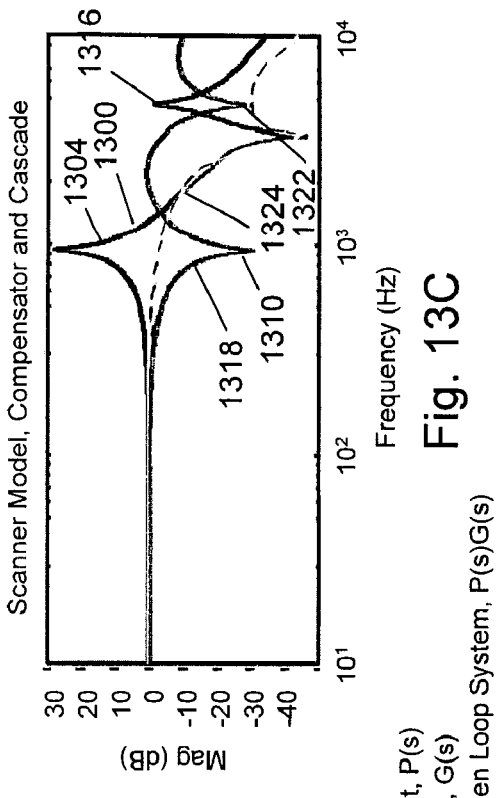
FIGS. 13A and 13B are plots of the frequency domain and phase domain, respectively, of a model of scanner dynamics and a first iteration of resonance compensation.
Figure 13B:
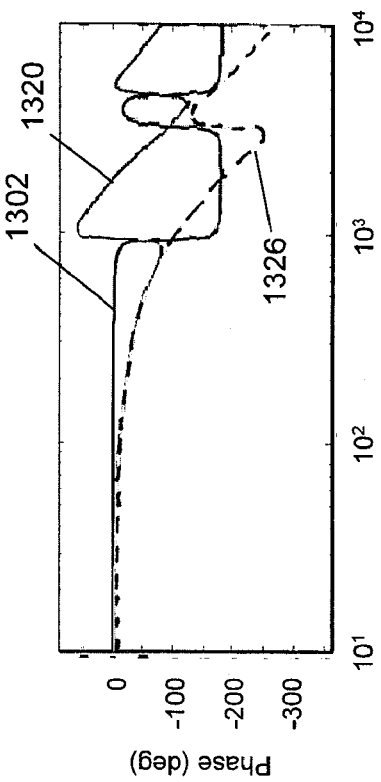
Figure 13C:
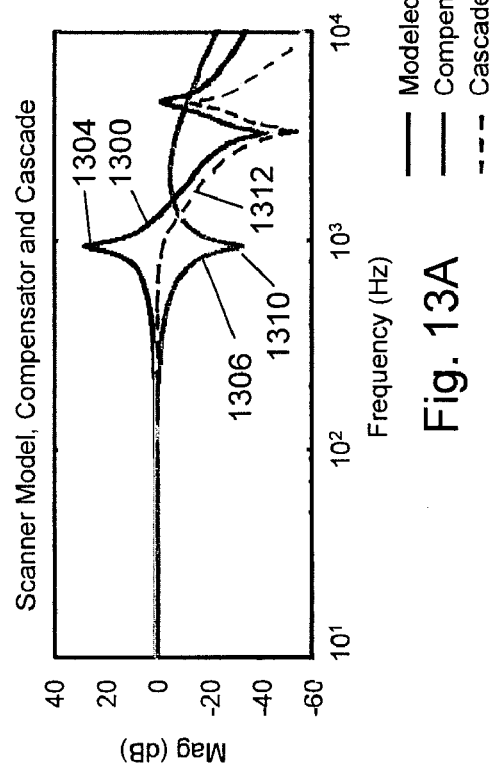
FIGS. 13C and 13D are plots of the frequency domain and phase domain, respectively, of a model of scanner dynamics and a second iteration of resonance compensation.
Figure 13D:
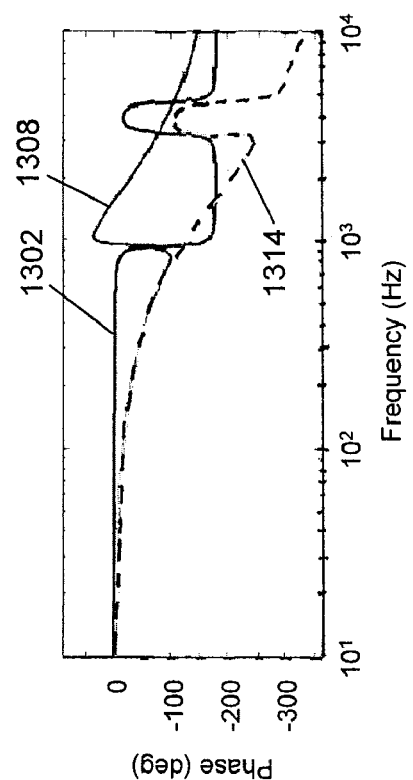

Referring to FIGS. 13A and 13B, the outcome of the fitting algorithm described above is used in a mathematical model of the scanner dynamics. A model of the scanner is plotted in the frequency domain (curve 1300) and in the phase domain (curve 1302) according to the following equation, the parameters of which were determined in the fitting algorithm:

$$G_1(s) = \frac{(s^2 + 2\zeta_{p1}\omega_{p1}s + \omega_{p1}^2)}{\omega_{p1}^2}\left(\frac{\omega_{ro}}{s+\omega_{ro}}\right)^4.$$

A peak 1304 in the frequency domain indicates the location of the scanner resonance. In order to prevent oscillations or ringing of the scanner, a filter is developed to cancel the effect of the resonance peak 1304. Specifically, the filter is the inverse of the scanner model 1300, with the addition of a roll-off region, as shown in compensation curves 1306 (in the frequency domain) and 1308 (in the phase domain). An inverse peak 1310 counteracts the effect of the resonance peak 1304, resulting in compensated scanner dynamics represented as curves 1312 and 1314. The resonance peak 1304 in the original scanner model is no longer present in the compensated scanner dynamics.

The model-based filtering is preferably time-invariant in its ability to compensate for scanner resonance at any scan rate. Furthermore, the filter is designed to a recent system identification, rather than being designed robustly to apply to all possible plant variability.

In some cases, the sample topography may have a spatial period that for some scan speeds occurs with similar periodicity to scanner disturbances. Referring again to FIG. 10A, in the case of the rat tail collagen, if the 67 nm banding patterns of collagen are oriented predominantly along the fast scan axis, the banding patterns may produce deflection traces that are highly correlated due only to sample features. This could cause the correlation algorithm described above to attribute this regular pattern to scanner dynamics. An effective input shaper will remove only the effect of scanner disturbances, revealing the underlying topography, as shown in FIG. 14B.

In order to unambiguously separate topography from scanner disturbances in the unusual situation where periodic topography masks as scanner ringing, it is helpful to consider the source of the two signals. The scanner dynamics originate from a time-invariant (TI) dynamic process, while the topography comes from the spatially invariant (SI) property of the sample. These two signals are mapped into the sampled-time domain (the analog-to-digital conversion process for imaging) through the scan velocity. In one embodiment, this mapping is varied while considering deflection signals in the temporal frequency domain. For instance, if the scan velocity is varied from 10 Hz to 20 Hz and the temporal frequency response of the deflection signal is plotted, those features that are stationary can be attributed to the TI part and used for scanner characterization. Alternatively, two images can be taken at the same scan speed but with different orientations or scan directions; a similar temporal or spatial frequency response test can then be performed to identify SI or TI properties.

In other embodiments, scanner disturbances can be separated from the spatial periods entirely. Scanner ringing is excited even at low scan speeds, but does not corrupt the image at low speeds because the Q factor is low enough to damp out the ringing before imaging occurs. With fast sampling of the deflection while scanning at low speeds, the scanner dynamics can still be identified, and a compensator is designed informed by the model obtained at low speed. Because the scanner is time invariant over the range of imaging experiments, a single compensator can be designed using low speed information where troublesome topography does not confound the algorithm, and that compensator can be effectively applied at high speed.

For instance, FIG. 15A-15C, images of rat tail collagen fibrils taken at high speed (20 Hz line rate) and FIGS. 15D-15G, taken at low speed (3 Hz line rate) reflect this approach. Image data highlighting the scan are used for identification, as shown in FIGS. 15A and 15D. At high speed, scanner resonance is difficult to distinguish from sample topography, as shown in the deflection traces of FIG. 15B. A frequency response plot of those deflection traces (FIG. 15C) shows a nebulous region of large energy around 100 Hz from the collagen spatial periods mapped into the sampled time domain, which overwhelm the scanner resonance at 3 Hz. For this imaging situation, the indirect identification method may be unable to converge to the correct scanner dynamic properties.

However, at low speed, spatial frequencies from the sample do not overlap the scanner resonance. When the deflection trace of FIG. 15E is sampled with high speed A/D converters, scanner resonance properties are detected at the beginning of the deflection trace (FIG. 15F) and a frequency response (FIG. 15G) clearly shows the scanner resonance at 3 Hz. From this information, the indirect identification method converges to the correct information about the scanner resonance and an effective feedforward compensator is designed. Because the scanner dynamic properties are time-invariant, the feedforward filter designed at low speed effectively avoids excitation of the scanner resonances at high speed, and high quality imaging at fast scan rates is achievable even in the presence of periodic topography.

In some instances, it may be desirable to perform a second filtering iteration. For instance, a peak 1316 due to a second (e.g., higher order) resonance mode is not removed by the first filtering iteration. In some cases, this second resonance peak may be strong enough for its resonance to be observed in an AFM image taken under the compensated scanner dynamics 1312. In this case, the scanner model 1300, 1302 is represented by the following higher-order equation:

$$G_2(s) = \frac{(s^2 + 2\zeta_{p1}\omega_{p1}s + \omega_{p1}^2)(s^2 + 2\zeta_{p2}\omega_{p2}s + \omega_{p2}^2)}{(\omega_{p1}\omega_{p2})^2}\left(\frac{\omega_{ro}}{s+\omega_{ro}}\right)^6$$

An inverse of the second resonance mode 1316 is computed and merged with the previously determined compensation curve to generate a second iteration compensation curve 1318, 1320. Compensation curve 1318 includes the inverse peak 1310 determined in the first iteration and an inverse peak 1322 corresponding to the second resonance peak 1316. To apply the filter, the compensation curve 1318 is subtracted from the scanner model 1300, resulting in second iteration compensated scanner dynamics 1324, 1326.

Referring to FIGS. 14A-14C, height and deflection images 1400a, 1400b were captured with no filter compensation. A first iteration of the filtering algorithm resulted in images 1402a, 1402b with significantly reduced but not entirely absent resonance oscillations. A second iteration of the filtering algorithm, in which a second resonance mode was removed from the scanner dynamics, resulted in images 1404a, 1404b with substantially no resonance oscillations.

In some embodiments, a model-based filter can be designed to compensate for scanner resonances even without access to excitation signals. In these cases, compensation can occur as long as lateral disturbances are large enough to be observed in the image.

In some cases, AFM is configured to probe other surface properties of the sample, including but not limited to local magnetic domains; local variations in elastic modulus, resistivity, or chemical potential; or other local properties. In these cases, the probe bends in response to variations in the property under investigation and the deflection data reflects local variations in that property. In other instances, the AFM may be operated in other modes, such as hopping mode. Furthermore, although the AFM described above has orthogonal X, Y, and Z axes, in other embodiments, the axes of the AFM are not necessarily mutually orthogonal.

Although the above description refers specifically to atomic force microscopy, a scanning tunneling microscope (STM), near-field optical microscope (NSOM), scanning electrochemical microscope (SECM), electric force microscope (EFM), ion conductance microscope, or other type of scanning probe microscope (SPM) may be used in place of AFM 100. Furthermore, scanners based on mechanical flexures may be used instead of piezoelectrically actuated scanners. More generally, the filtering methodology described above is not specific to actuators but may be applied to any instrument in which a scanner's lateral dynamics couple into an out-of-plane axis. The methodology could also be applied to other types of stages, such as high speed nanopositioners, lithography machines, and wafer positioners. Furthermore, the methodology could be combined with microscope-based nanolithography techniques such as dip pen lithography.

It is to be understood that the foregoing description is intended to illustrate and not to limit the scope of the invention, which is defined by the scope of the appended claims. Other embodiments are within the scope of the following claims.

What is claimed is:

1. A method comprising:
   generating, using a sensor, a data signal including:
   a first component of the data signal based on a motion in a first direction of an actuator configured to provide motion between a sample and a probe in the first direction, the first direction substantially in the plane of the sample; and
   a second component of the same data signal based on at least one of topographic variations of the sample in a second direction, and a materials property of the sample;
   generating, using a processor, a compensatory signal based on the first component of the data signal generated by the sensor; and
   providing the compensatory signal to the actuator.

2. The method of claim 1, wherein the actuator is a first actuator; and
   wherein providing the compensatory signal further comprises providing the compensatory signal to a second actuator configured to provide relative motion between the sample and the probe in a third direction not parallel to the first direction, the third direction substantially in the plane of the sample.

3. The method of claim 1, wherein the first component of the data signal is based on a resonance of the actuator in the first direction, and
   wherein generating the compensatory signal includes generating a compensatory signal that at least partially cancels effects of the resonance of the actuator in the first direction.

4. The method of claim 1, wherein generating the compensatory signal includes determining at least one parameter for a model of the motion of the actuator.

5. The method of claim 1, wherein generating the data signal includes generating the data signal while the actuator is providing relative motion between the sample and the probe, and
   wherein generating the compensatory signal includes generating the compensatory signal while the actuator is providing relative motion between the sample and the probe.

6. The method of claim 1, further comprising generating, using a data acquisition module, an image of the sample based on deflection signals received from the sensor.

7. The method of claim 1, wherein generating the compensatory signal includes generating at least two iterations of compensatory signals, including generating a second iteration of the compensatory signal based on a response of the actuator to a first iteration of the compensatory signal.

8. The method of claim 1, wherein the actuator is further configured to support the sample.

9. A system for scanning a sample, the system comprising:
   a probe positioned relative to the sample;
   a scanner including:
      an actuator configured to provide relative motion between the sample and the probe in a first direction substantially in the plane of the sample;
   a sensor configured to generate a data signal based on a property of the sample, the data signal including:
      a first component of the data signal based on motion in the first direction of the actuator; and
      a second component of the same data signal based on at least one of topographic variations of the sample in a second direction and a materials property of the sample; and
   a compensation module configured to generate a compensatory signal based on the first component of the data signal generated by the sensor and to provide the compensatory signal to the actuator.

10. The system of claim 9, wherein the actuator is a first actuator; and
    wherein the scanner further comprises a second actuator configured to provide relative motion between the sample and the probe in a third direction not parallel to the first direction, the third direction substantially in the plane of the sample.

11. The system of claim 10, wherein the compensation module is configured to provide the compensatory signal to the second actuator.

12. The system of claim 9, wherein the first component of the data signal is based on a resonance of the actuator in the first direction, and wherein the compensatory signal at least partially cancels effects of the resonance of the actuator in the first direction.

13. The system of claim 9, wherein the compensation module is configured to identify the first component of the data signal generated by the sensor.

14. The system of claim 9, wherein the compensation module is configured to filter the data signal generated by the sensor and to generate the compensatory signal based on the filtered data signal.

15. The system of claim 9, wherein the sensor is configured to generate the data signal and the compensation module is configured to generate the compensatory signal while the actuator is providing relative motion between the sample and the probe.

16. The system of claim 9, wherein the system is a scanning probe microscope.

17. The system of claim 9, wherein the compensation module is configured to generate at least two iterations of compensatory signals.

18. The system of claim 9, wherein the actuator is further configured to support the sample.

19. A method comprising:
   receiving a data signal from a sensor, the data signal including:
      a first component of the data signal based on a motion in a first direction of an actuator configured to provide motion between a sample and a probe in the first direction, the first direction substantially in the plane of the sample; and
      a second component of the same data signal based on at least one of topographic variations of the sample in a second direction and a materials property of the sample; and
   based on the first component of the data signal, determining, using a processing module, a characterization of the actuator.

20. The method of claim 19, wherein receiving the data signal includes receiving a plurality of line signals, each line signal corresponding to a region of the sample.

21. The method of claim 20, wherein determining the characterization of the actuator comprises determining a correlation between at least some of the plurality of line signals.

22. The method of claim 21, wherein determining the correlation includes determining the correlation using a time domain model.

23. The method of claim 19, wherein determining the characterization of the actuator includes determining, based on the first component of the data signal, at least one of a plurality of parameters included in a predefined model of the actuator.

24. The method of claim 23, wherein the parameters included in the predefined model include at least one of a resonance frequency of the actuator and a quality factor of the actuator.

25. The method of claim 23, wherein determining at least one of the plurality of parameters includes not determining all of the plurality of parameters.

26. The method of claim 23, further comprising programming the processing module with the predefined model prior to receiving the data signal.

27. The method of claim 26, wherein the predefined model includes at least one variable, and
   wherein determining the characterization of the actuator includes determining the value of the at least one variable.

28. The method of claim 19, further comprising:
   generating, using a compensation module, a compensatory signal based on the characterization of the actuator; and
   providing the compensatory signal to the actuator.

29. The method of claim 28, wherein generating the compensatory signal includes generating a compensatory signal that at least partially cancels effects of a resonance of the actuator in the first direction.

30. The method of claim 19, further comprising determining the characterization of the actuator while the actuator provides relative motion between the sample and the probe.

31. The method of claim 19, wherein receiving the data signal includes receiving a first data signal representative of relative motion at a first frequency and receiving a second data signal representative of relative motion at a second frequency, the first frequency lower than the second frequency, and
   wherein determining the characterization of the actuator includes determining the characterization of the actuator based on the first data signal.

32. The method of claim 20, wherein each line signal corresponds to a portion of the data signal, that includes the first and second components, and is representative of deflection of the probe in the second direction as the probe is scanned in the first direction across the corresponding region of the sample.

33. The method of claim 19, wherein the actuator is further configured to support the sample.

* * * * *